United States Patent
Araujo et al.

(10) Patent No.: US 10,733,292 B2
(45) Date of Patent: Aug. 4, 2020

(54) DEFENDING AGAINST MODEL INVERSION ATTACKS ON NEURAL NETWORKS

(71) Applicant: International Business Machines Corporation, Armonk, NY (US)

(72) Inventors: Frederico Araujo, White Plains, NY (US); Jialong Zhang, White Plains, NY (US); Teryl Taylor, Danbury, CT (US); Marc P. Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/031,330

(22) Filed: Jul. 10, 2018

(65) Prior Publication Data

US 2020/0019699 A1    Jan. 16, 2020

(51) Int. Cl.
| | |
|---|---|
| *G06F 21/55* | (2013.01) |
| *G06N 3/08* | (2006.01) |
| *H04L 29/06* | (2006.01) |
| *G06N 3/04* | (2006.01) |

(52) U.S. Cl.
CPC ......... *G06F 21/554* (2013.01); *G06N 3/0454* (2013.01); *G06N 3/08* (2013.01); *H04L 63/1491* (2013.01); *G06F 2221/034* (2013.01)

(58) Field of Classification Search
CPC ... G06F 21/554; G06F 2221/034; G06N 3/02; G06N 3/0454; G06N 3/08; H04L 63/1491
See application file for complete search history.

(56) References Cited

U.S. PATENT DOCUMENTS

| | | |
|---|---|---|
| 10,225,277 B1 * | 3/2019 | Shintre ............... G06F 21/6254 |
| 2011/0167495 A1 | 7/2011 | Antonakakis et al. |
| 2013/0097704 A1 | 4/2013 | Gavrilut et al. |

FOREIGN PATENT DOCUMENTS

WO    WO2013/113532 A1    8/2013

OTHER PUBLICATIONS

Hitaj et al., Deep Models Under the GAN: Information Leakage from Collaborative Deep Learning, 2017.*
Wang et al., Stealing Hyperparameters in Machine Learning, 2018 IEEE Symposium on Security and Privacy (SP) Proceedings, May 2018.*

(Continued)

*Primary Examiner* — Minh Dinh
(74) *Attorney, Agent, or Firm* — Stephen J. Walder, Jr.; Jeffrey S. LaBaw

(57) ABSTRACT

Mechanisms are provided for protecting a neural network model against model inversion attacks. The mechanisms generate a decoy dataset comprising decoy data for each class recognized by a neural network model. The mechanisms further configure the neural network model to generate a modified output based on the decoy dataset that directs a gradient of the modified output to the decoy dataset. The neural network model receives and process input data to generate an actual output. The neural network model modifies one or more actual elements of the actual output to be one or more corresponding modified elements of the modified output, and returns the one or more corresponding modified elements, instead of the one or more actual elements, to the source computing device.

20 Claims, 6 Drawing Sheets

(56) References Cited

OTHER PUBLICATIONS

Anderson, Ross, "Why Information Security is Hard—An Economic Perspective", Proceedings of the 17th Annual Computer Security Applications Conference (ACSAC), Dec. 10-14, 2001, 8 pages.

Athalye, Anish et al., "Obfuscated Gradients Give a False Sense of Security: Circumventing Defenses to Adversarial Examples", Cornell University Library, arXiv: 1802.00420v2 [cs.LG], Feb. 15, 2018, 12 pages.

Dhillon, Guneet S. et al., "Stochastic Activation Pruning for Robust Adversarial Defense", Sixth International Conference on Learning Representations (ICLR '18), Apr. 30-May 3, 2018, pp. 1-13.

Fredrikson, Matt et al., "Model Inversion Attacks that Exploit Confidence Information and Basic Countermeasures", ACM Conference on Computer and Communications Security (CCS'15), Oct. 12-16, 2015, 12 pages.

Guo, Chuan et al., "Countering Adversarial Images Using Input Transformations", Sixth International Conference on Learning Representations (ICLR '18), Apr. 30-May 3, 2018, submitted version from arXiv:1711.00117v3 [cs.CV], Jan. 25, 2018, pp. 1-12.

High, Rob, "The Era of Cognitive Systems: An Inside Look at IBM Watson and How it Works", IBM Corporation, Redbooks, Dec. 12, 2012, 16 pages.

Juels, Ari, "A Bodyguard of Lies: The Use of Honey Objects in Information Security", Proceedings of the 19th ACM Symposium on Access Control Models and Technologies (SACMAT '14), Jun. 25-27, 2014, pp. 1-3.

Madry, Aleksander et al., "Towards Deep Learning Models Resistant to Adversarial Attacks", Cornell University Library, arXiv: 1706.06083v3 [stat.ML], Nov. 9, 2017, pp. 1-27.

Merkow, Mark S. et al., "Information Security: Principles and Practices, Second Edition", Pearson Education, May 27, 2014, (General Description Submitted) 2 pages.

Song, Congzheng et al., "Machine Learning Models that Remember Too Much", ACM Conference on Computer and Communications Security (CCS '17), Oct. 30-Nov. 3, 2017, pp. 587-601.

Song, Yang et al., "PixelDefend: Leveraging Generative Models to Understand and Defend Against Adversarial Examples", Sixth International Conference on Learning Representations (ICLR '18), Apr. 30-May 3, 2018, submitted version from arXiv:1710.10766v2 [cs.LG], Feb. 14, 2018, pp. 1-20.

Xie, Cihang et al., "Mitigating Adversarial Effects Through Randomization", Sixth International Conference on Learning Representations (ICLR '18), Apr. 30-May 3, 2018, submitted version from arXiv:1711.01991v3 [cs.CV], Feb. 28, 2018, pp. 1-16.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

generate a modified output based on the decoy dataset that directs a gradient of the modified output to the decoy dataset. Moreover, the method comprises receiving, by the first neural network model, from a source computing device, input data to be processed by the first neural network model, and processing, by the first neural network model, the input data to generate an actual output. Furthermore, the method comprises modifying, by the first neural network model, one or more actual elements of the actual output to be one or more corresponding modified elements of the modified output, and returning, by the first neural network model, the one or more corresponding modified elements instead of the one or more actual elements, to the source computing device.

DEFENDING AGAINST MODEL INVERSION ATTACKS ON NEURAL NETWORKS

BACKGROUND

The present application relates generally to an improved data processing apparatus and method and more specifically to mechanisms for defending against model inversion attacks on neural networks.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for protecting a neural network model against model inversion attacks, the method being performed in a data processing system comprising at least one processor and at least one memory, the at least one memory comprising instructions executed by the at least one processor to specifically configure the at least one processor to implement the neural network model and a targeted deceptive gradient engine. The method comprises generating, by the targeted deceptive gradient engine, a decoy dataset comprising decoy data for each class recognized by the neural network model. The method further comprises configuring, by the targeted deceptive gradient engine, a first neural network model to generate a modified output based on the decoy dataset that directs a gradient of the modified output to the decoy dataset. Moreover, the method comprises receiving, by the first neural network model, from a source computing device, input data to be processed by the first neural network model, and processing, by the first neural network model, the input data to generate an actual output. Furthermore, the method comprises modifying, by the first neural network model, one or more actual elements of the actual output to be one or more corresponding modified elements of the modified output, and returning, by the first neural network model, the one or more corresponding modified elements instead of the one or more actual elements, to the source computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
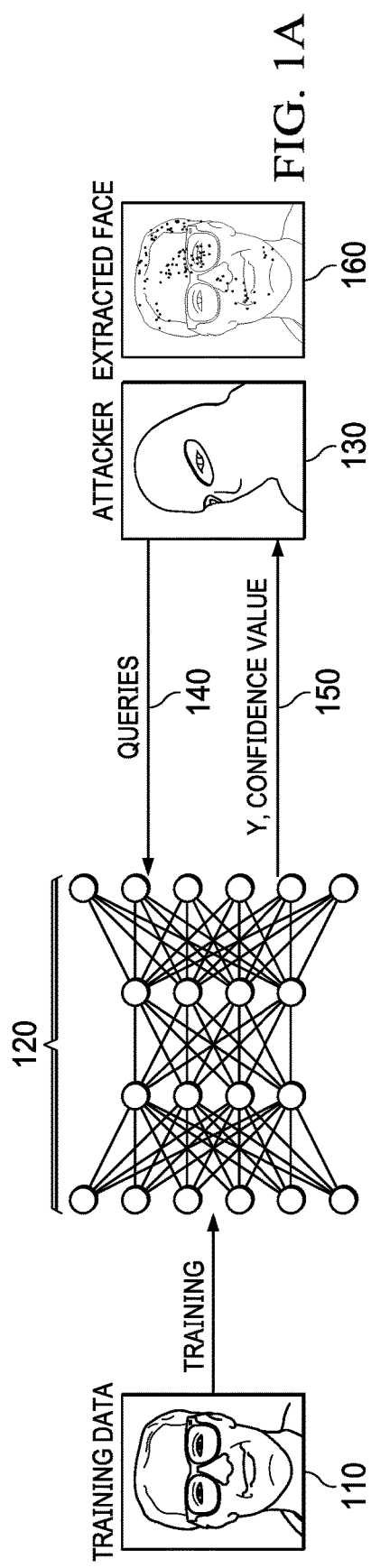
FIG. 1A shows a general depiction of the model inversion attack problem addressed by the illustrative embodiments.

The illustrative embodiments provide mechanisms for protecting deep learning neural networks (DNNs) or convolutional neural networks (CNNs) (collectively referred to herein as simply neural networks), machine learning systems employing such neural networks, cognitive systems employing such neural networks, and the like, by defending such systems against model inversion attacks on the neural networks. The mechanisms of the illustrative embodiments utilize deceptive gradients that direct such model inversion attacks towards pre-determined decoy inputs that are traceable. Moreover, the mechanisms of the illustrative embodiments provide trace mechanisms for detecting attempts to perform model inversion attacks. The tracing mechanisms use the pre-determined decoy inputs as "fingerprints" of such attempts so that they may be detected, reported, and/or responsive protective actions may be performed.

While the illustrative embodiments will be described in the context of a neural network-based mechanism and cognitive system, the illustrative embodiments are not limited to such. Rather, the mechanisms of the illustrative embodiments may be utilized with any artificial intelligence mechanism, machine learning mechanism, deep learning mechanism, or the like, whose training dataset may be protected from model inversion attacks in accordance with the illustrative embodiments set forth hereafter, such that the training of the neural network-based mechanism is not able to be reproduced via a model inversion attack. It should be appreciated that the term "model" as it is used herein refers to a trained neural network, such as a trained DNN or CNN, and may be used interchangeably with the term "neural network" herein.

Moreover, while the illustrative embodiments will be described in the context of image analysis and classification being performed by the trained DNN, CNN, or model, the illustrative embodiments and the present invention are not limited to such. Image analysis and classification is selected as an example due to recent popularity of face/image recognition application programming interfaces (APIs). Rather, the illustrative embodiments may be implemented with any trained DNN, CNN, or model performing analysis and/or classification with regard to any suitable input including, but not limited to, speech input, text input, and the like, e.g., the trained DNN, CNN, or model may be implemented to perform speech and/or text recognition operations.

The success of neural network-based systems has resulted in many web services based on them. Service providers provide application program interfaces (APIs) to end users of the web services through which the end users may submit, via their client computing devices, input data to be processed by the web service, and are provided results data indicating the results of the operations of the web services on the input data. Many times, cognitive systems utilize the neural networks to perform classification type operations to classify input data into various defined categories of information. For example, in an image processing web service, an input image comprising a plurality of data points, e.g., pixels, may be input to the web service which operates on the input image data to classify elements of the input image into types of objects present within the image, e.g., the image comprises a person, a car, a building, a dog, particular facial features of a face image, particular retinal features of a retina image, etc., to thereby perform object or image recognition. Similar types of classification analysis may be performed for various other types of input data, as mentioned above, including, but not limited to, speech recognition, natural language processing, audio recognition, social network filtering, machine translation, and bioinformatics. Of particular interest to some illustrative embodiments described herein, such web services may provide functionality for analyzing and classifying input images for purposes of performing security based operations, e.g., verifying the identity of individuals, identifying suspicious activity, identify persons of interest, and the like. It should be appreciated that while the illustrative embodiments will be described in the context of image processing, the illustrative embodiments are not limited to such and, as noted above, may be applied to any type of input, such as voice input for speech recognition, sound input for sound recognition, gesture based recognition, etc.

While neural networks and the cognitive systems employing such neural networks have achieved remarkable performance on many recognition tasks, such as visual or image recognition tasks, recent research, such as described in Song et al., "Machine Learning Models that Remember Too Much," CCS 2017, has shown that these mechanisms can "memorize" information about the training dataset within the model itself, e.g., within the deep learning neural network (DNN). Moreover, recent research, such as described in Fredrikson et al., "Model Inversion Attacks that Exploit Confidence Information and Basic Countermeasures," CCS 2015, has shown that a model inversion attack can be used to recover such "memorized" sensitive information, e.g., images of the training data, from the trained DNN. For example, the model inversion attack can reconstruct faces in a training dataset by simply accessing the API of the trained DNN. Such model inversion attacks can therefore break the privacy of sensitive information, such as proprietary or protected training data.

Obfuscation of the gradient involves the use of the "security through obscurity" approach. The "security through obscurity" approach refers to security practices that rely upon an adversary's ignorance of the system design rather than any fundamental principle of security. History has demonstrated that such practices offer very weak security at best, and are dangerously misleading at worst, potentially offering an illusion of security that may encourage poor decision-making. Specifically, in DNN contexts, Athalye et al., "Obfuscated Gradients Give a False Sense of Security: Circumventing Defenses to Adversarial Examples," arXiv:1802.00420v2, Feb. 15, 2018, have demonstrated that obfuscated gradients, a type of gradient masking, are ineffective to protect against an adaptive attacker, leading to a false sense of security in defenses against adversarial examples and model extraction attacks. Security defenses based on deception potentially run the risk of falling into the "security through obscurity" trap. If the defense's deceptiveness hinges on attacker ignorance of the system design, details that defenders should conservatively assume will eventually become known by any suitably persistent threat actor, then any security offered by the defense might be illusory and therefore untrustworthy.

It is therefore important to carefully examine the underlying basis upon which deceptive gradients can be viewed as a security-enhancing technology to protect neural network, or deep learning neural network (DNN), classifiers against model inversion attacks, as is presented in the present invention. Like all deception strategies, the effectiveness of deceptive gradients relies upon withholding certain secrets from adversaries (e.g., which decoy representations are used in the training process). However, secret-keeping does not in itself disqualify a technique as obscurity-reliant. For example, modern cryptography is frequently championed as a hallmark of anti-obscurity defense despite its foundational assumption that adversaries lack knowledge of private keys, because disclosing the complete implementation details of crypto algorithms does not aid attackers in breaking cyphertexts derived from undisclosed keys.

A. Juels, "A Bodyguard of Lies: The use of honey objects in information security," Proceedings of the $19^{th}$ ACM Symposium on Access Control Models and Technologies (SACMAT), 2014, defines indistinguishability and secrecy as two properties required for successful deployment of honey systems. These properties are formalized as follows. Consider a simple system in which S={s1, . . . ,sn} denotes a set of n objects of which one, s*=sj, for j∈{1, . . . ,n} is the true object, while the other n−1 are honey objects. The two properties then are:

(1) Indistinguishability: To deceive an attacker, honey objects must be hard to distinguish from real objects. They should, in other words, be drawn from a probability distribution over possible objects similar to that of real objects.

(2) Secrecy: In a system with honey objects, j is a secret. Honey objects can, of course, only deceive an attacker that doesn't know j, so j cannot reside alongside S. Kerckhoffs' principle therefore comes into play: the security of the system must reside in the secret, i.e., the distinction between honey objects and real ones, not in the mere fact of using honey objects.

Deceptive gradients, as a methodology, satisfies both these properties by design: Indistinguishability derives from the inability of an attacker to determine whether an apparently successful attack is the result of exploiting a DNN model using a derived decoy. Secrecy implies that the decoy training set should be secret. However, full attacker knowledge of the design and implementation details of the machine learning model and algorithms does not disclose which decoys have been selected in the training process. Adapting Kerckhoffs' principle for deception, decoy training is not detectable even if everything about the system, except the training set, is public knowledge.

Thus, deceptive gradients, as a paradigm, does not derive its security value from obscurity. Rather, its deceptions are based on well-defined secrets. Maintaining this confidentiality distinction between the publicness of the DNN design and implementation details, versus the secrecy of the training set is important for crafting robust, effective deceptions to protect against model inversion attacks.

Unlike gradient obfuscation techniques, the mechanisms of the illustrative embodiments direct attackers to generate fake gradients, which steers model recovery in a model inversion attack towards pre-defined decoys rather than real training data. In contrast to obfuscation-based defense systems, the illustrative embodiments trick attackers into believing that they have successfully recovered real training datasets, while the deceptive gradients effectively "fingerprint" the model, affording the defending system the opportunity to accurately detect model inversion attacks when they occur and track such attacks on the machine learning application programming interfaces.

More specifically, the illustrative embodiments enhance neural network classifiers, such as DNN classifiers, with deceptive gradients that steer model inversion attacks towards learning fake representations of the training data, therefore making trained models resistant to model inversion attacks. Moreover, the illustrative embodiments leverage this capability to transparently imprint telltale decoys in the perceived model representation to discern malicious uses of the trained model and facilitate the detection of adversarial probes. In addition, the solution offered by the illustrative embodiments can be realized as an in-lined procedure to the classification process, thus being suitable for both black-box (not knowing the internal workings of the system) and white-box (having knowledge of the internal workings of the system) machine learning configurations.

In one illustrative embodiment, the mechanisms of the illustrative embodiments first generate decoy data x' for each class recognized by the neural network DNN(f(x) co-domain), assumed to be a deep learning neural network (DNN) hereafter. Given an input x, the input x is first input into the DNN f(x) to obtain its classification result y=f(x), where y is the output of the DNN classifier which comprises confidence scores associated with vector slots, where each vector slot corresponds to a class. A difference between the input data x and its corresponding decoy data is calculated (x'−x). Instead of returning the real y to the user, the illustrative embodiment calculates a fake classification result y' to equate the gradient of the DNN model's loss function to (x'−x), ensuring that the largest class label of y' remains equal to y(argmax(y)=argmax(y')), where y' is the fake classification result and will be returned to the user.

If a benign user receives y', the user still receives the correct classification result since argmax(y)=argmax(y'). However, if an attacker uses a model inversion attack based on y' to calculate the gradient for the input data x, the attacker will get (x'−x)+x=x'. In this way, the attacker will recover the pre-defined decoy, which can be further used by the mechanisms of the illustrative embodiments to identify the adversarial behavior.

In addition to protecting the DNN classifier from model inversion attacks by redirecting the attack to a pre-defined decoy training dataset, the illustrative embodiments further provide mechanisms for model inversion attack detection and tracking. With regard to such mechanisms, the illustrative embodiments train a separate DNN model g(x) with the original training dataset and the corresponding decoy dataset, maintaining separate labels for genuine and decoy data. When user requests are sent to the front-end machine learning or cognitive system API, the requests are also relayed to the separate DNN model g(x) to determine whether the input data is a reconstructed, i.e. model inverted, decoy. That is, the input data is input to g(x) which classifies the input data as either genuine or decoy data. If the input data is classified as decoy data, then the machine learning or cognitive system flags the request as suspicious and takes a predetermined protective action. The predetermined protective action may take many different forms depending on the desired implementation, such as logging the suspicious request and information about its origin, notifying a system administrator or other authorized individual, performing a protective action to prevent further access to the protected system, etc. In one illustrative embodiment, the predetermined protective action may comprise a machine learning API housing the trained DNN logging any malicious queries including their payloads (for auditing and analysis purposes, collecting attributes of the remote client making the queries (e.g., IP address, web client information, and the like), alerting administrators about security policy violations (e.g., misuse of extracted decoys), and potentially blocking (temporarily or permanently) such malicious clients from accessing any machine learning APIs serviced by the organization.

Thus, the mechanisms of the illustrative embodiments improve the operation of the neural network and the machine learning or cognitive system implementing the neural network, by adding additional non-generic functionality that previously did not exist in the neural network mechanism or machine learning or cognitive system, specifically for protecting against, as well as identifying and responding to, model inversion attacks. The mechanisms of the illustrative embodiments add additional technological logic in the neural network and machine learning or cognitive system that specifically implements the generation of deceptive gradients that point to specific predefined fake training datasets. Moreover, in some illustrative embodiments, the mechanisms introduce additional logic in the machine learning or cognitive system to detect and track model inversion attacks. The mechanisms of the illustrative embodiments are specific to a technological environment involving one or more data processing systems and/or computing devices that are specifically configured to implement the additional logic of the present invention thereby resulting in a non-generic technological environment comprising one or more non-generic data processing systems and/or computing devices. Moreover, the illustrative embodiments are specifically directed to solving the technological problem of model inversion attacks by reproducing the training datasets of specialized computing devices having neural network models, machine learning models, deep learning models, or other such artificial intelligence or cognitive operation based computing mechanisms.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general-purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
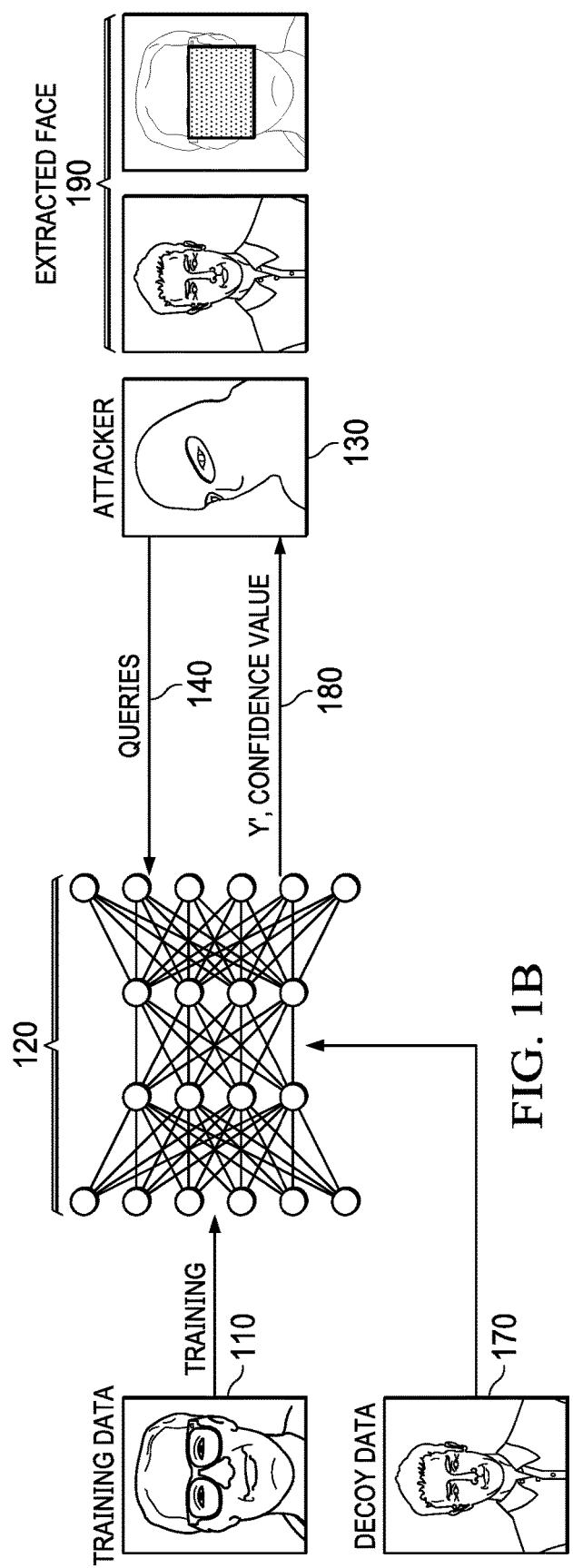
FIG. 1B shows a general depiction of the result of a model inversion attack on a DNN classifier protected using the mechanisms of the illustrative embodiments.

As noted above, the present invention provides mechanisms for protecting machine learning and cognitive systems, such as those comprising neural networks, from model inversion attacks. FIG. 1A shows a general depiction of the model inversion attack problem addressed by the illustrative embodiments. FIG. 1B shows a general depiction of the result of a model inversion attack on a DNN classifier protected using the mechanisms of the illustrative embodiments.

The examples shown in FIGS. 1A and 1B assume that the neural network model is being used to perform a classification operation on an image of a face to thereby classify the image of the face as one of a predetermined number of classes of faces, e.g., different authorized users, different persons of interest, etc., with corresponding confidence values associated with the classifications. This is used only as an example of one possible simple classification operation that the neural network model may be used to perform and is not to be considered limiting on the applications of a neural network model with which the mechanisms of the illustrative embodiments may be implemented. As noted above, the mechanisms of the illustrative embodiments may be utilized with the outputs of any neural network models, regardless of the particular artificial intelligence operations performed by the neural network models, machine learning models, or the like. Moreover, although not shown explicitly in FIGS. 1A and 1B, the neural network model, machine learning model, deep learning model, or the like, may be part of a more complex cognitive system that implements such a model to perform a complex cognitive operation, such as natural language processing, image analysis, patient treatment recommendation, medical imaging analysis, or any of a plethora of other cognitive operations.

As shown in FIG. 1A, a DNN classifier 120 is trained using a training dataset 110 which results in a model in which the weights of the nodes of the DNN classifier 120 are adjusted to accurately classify images in the training dataset 110. The trained DNN classifier 120 performs a classification operation for classifying the input dataset 110, e.g., classifying an input image into one of a plurality of possible classes of images. For example, in one illustrative embodiment, each class may correspond to a particular authorized user of a secured physical or logic resource, e.g., a computing system, database, physical premises, or the like, and the input image is classified into one of the classes, or a class corresponding to an unauthorized user. The output of the classification operation is a vector of probability values, or confidence scores, where each slot of the vector output represents a separate possible classification of the input dataset 110.

The training of a neural network is generally known in the art and it is assumed that any such methodology may be used to perform such training. The training generally involves modifying weighting values associated with various features scored by nodes of the DNN classifier 120 based on training datasets 110 to cause the DNN classifier 120 to output a correct vector output labeling the input dataset 110 correctly based on supervised or semi-supervised feedback. The DNN classifier 120 processes the input dataset 110 through the various levels of nodes in the neural network model 130 to generate at the output nodes probability values corresponding to the particular class or label that the output node represents, i.e. the output node's value indicates the probability that the class or label of the corresponding vector slot applies to the input data set 120.

As a result of the training, the weights of the nodes of the DNN classifier 120 implicitly memorize the training dataset 110. Hence, if an attacker 130 is able to determine the particular training dataset 110 used to train the DNN classifier 120, the attacker 130 may be able to recreate the DNN classifier 120 by using the same training dataset 110 to train their own version of the DNN classifier 120, for example.

Thus, for example, the attacker 130, attempting to perform a model inversion attack, may submit a series of queries 140 to the trained DNN classifier 120 which responds with the correct classifications and corresponding confidence values, e.g., percentages that the input data in the query is properly classifiable in the corresponding classification. The attacker 130 attempts to learn the local minimums in order to learn a representation 160 of the original training dataset used to train the DNN classifier 120, i.e. given a seed (e.g., an initial image), the attack applies gradient descent to modify that image until it converges to the target (which should satisfy the optimization criteria). The model inversion attack is cast as an optimization problem that depends on the classification label and confidence vector only, i.e. find the input that maximizes the returned confidence, subject to the classification also matching the target. The algorithm for solving this problem uses gradient descent as a base technique. More details, with reference to two formulations of the model inversion attack against face recognition APIs, may be found, for example, in Fredrikson et al., "Model Inversion Attacks that Exploit Confidence Information and Basic Countermeasures," CCS' 15, Oct. 12-16, 2015.

As shown in FIG. 1B, the DNN classifier 120 is again trained using the training data set 110, but a predetermined decoy input dataset 170 is used to calculate a fake confidence value and return it to the attacker 130. Specifically, as will be described in greater detail hereafter, given a query x 140, the query 140 is first input into the DNN classifier 120 to obtain the real confidence y. Then, the difference between the input x and decoy x' is calculated. A fake confidence y' is calculated by solving that $x'-x=\varepsilon \cdot sign(\nabla_m Loss(x, y'))$. The DNN classifier 120 then returns y' 180 in FIG. 1B as the confidence score to x.

That is, rather than returning the actual confidence value, the DNN classifier 120 outputs the output vector y' with corresponding confidence scores 180 in which the classification by the DNN classifier 120 provides the correct output result, but with modified confidence values that point any gradients towards the decoy dataset 170 DNN classifier 120, the DNN classifier 120 will return y' 180 as opposed to y 150. Thus, the attacker 130, attempting to recreate the training dataset 110 by determining the gradient based on the output 180 from the DNN classifier 120 will instead be directed to the decoy dataset 170, e.g., image 190 instead of the corresponding training image in the training dataset 110. In some illustrative embodiments, as denoted by the two images 190 in FIG. 1B, the decoy mechanisms of the illustrative embodiments may yield either a completely different image as compared to the target image, or an image that resembles the target image to the human eye but that can be discerned by a decoy detector mechanism of the illustrative embodiments, as described hereafter, e.g., a watermarked image. The determination of which decoy mechanism to utilize in a particular implementation may be driven by data sensitivity considerations, among other considerations.

Figure 2:
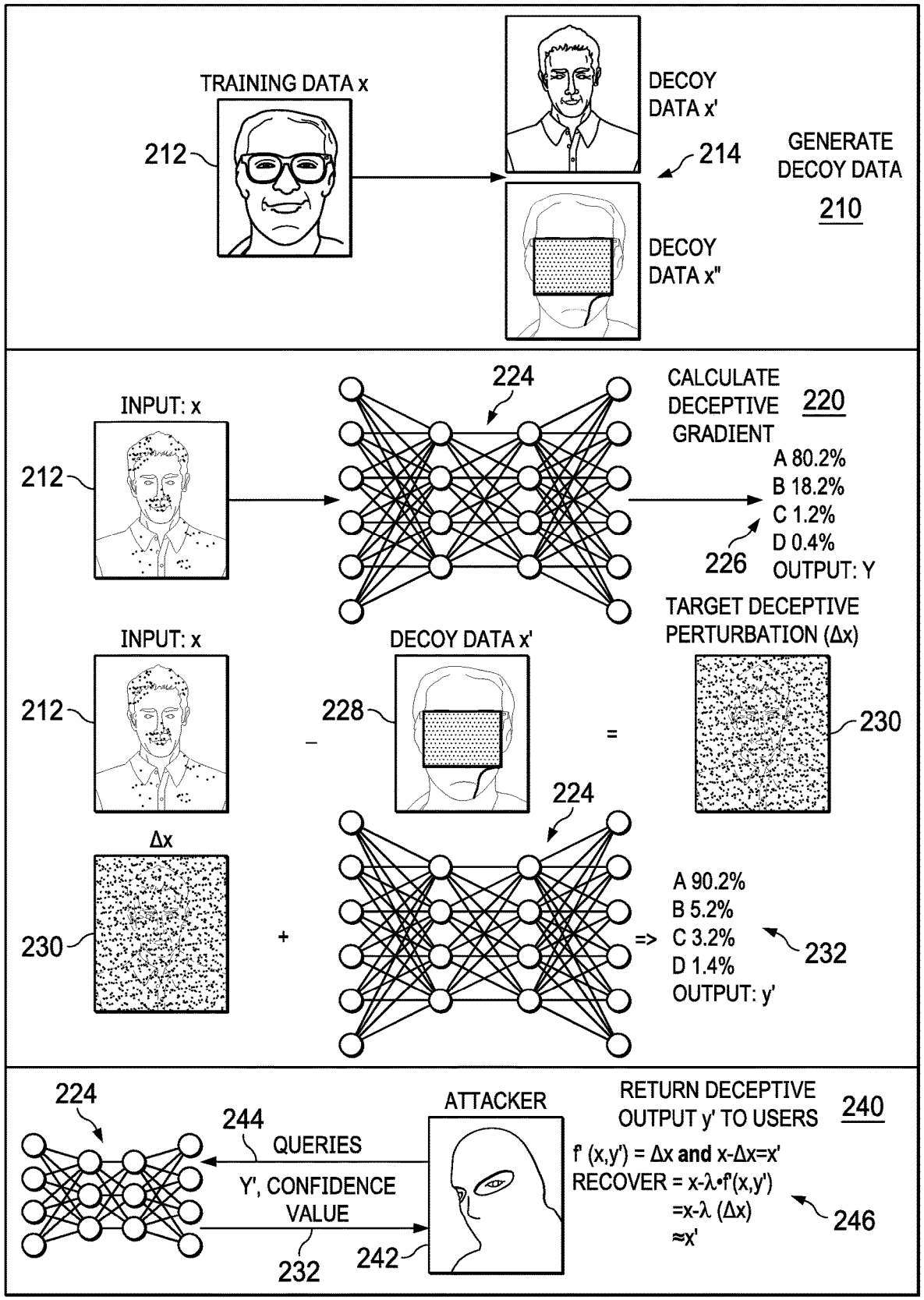
FIG. 2 is an example diagram outlining the operation for generating targeted deceptive gradients and using them to respond to an attacker's queries.

FIG. 2 is an example diagram outlining the operation for generating targeted deceptive gradients and using them to respond to an attacker's queries. It should be appreciated that the mechanisms of the illustrative embodiments generate "targeted" deceptive gradients in that the true gradient is modified to point towards a predetermined decoy dataset, e.g., a particular decoy image corresponding to the original training image, as opposed to the actual training dataset. This is different than using randomized noise or other mechanisms for introducing perturbations into the gradient, as the present invention is specifically concerned with targeting the gradient such that the attacker will be directed to the predetermined decoy data. This is to facilitate the detection and tracking of model inversion attacks should the attacker attempt to use the decoy data to try to learn the trained model.

As shown in FIG. 2, the targeted deceptive gradient generation starts by generating the decoy data x' for each class recognized by the DNN classifier (step 210). That is, for each class, e.g., each image or each image classification, in the training dataset 212, a corresponding decoy data x' 214 is generated. It should be noted that FIG. 2 illustrates a second decoy data x" which represents an alternative implementation in which the decoy data is defined as a watermarked image. If the main concern is to detect model inversion attack attempts and the implementation can afford controlled disclosure of sensitive/private information, the use of a watermarked image approach achieves better deception, i.e. it is difficult to tell that the image a decoy by looking at legitimate samples, and decoy generation is easier to automate as the decoy data is directly derived from the original training set.

In some embodiments, the decoy dataset may be manually generated by a subject matter expert (SME) and associations between particular portions of the decoy dataset x' 214 and the classes may be specified by such an SME. In some embodiments, the decoy dataset x' 214 may be generated from the original training dataset by way of automated mechanisms that introduce perturbations or modifications in the original training dataset x 212 to generate the decoy dataset x' 214. In still other illustrative embodiments, automated mechanisms, such as a generative adversarial network (GAN) or the like, may be used to generate decoy dataset x' 214 based on noise input. Any other mechanism for generating the decoy dataset x' 214 may be used without departing from the spirit and scope of the present invention.

Once the decoy data x' 214 is generated for each class in the training data x 212, the deceptive gradient perturbation Δx is calculated for each class (step 220). That is, given input x 212, which may be any image which the attacker may utilize as a seed image, e.g., a blurry image or empty image, the input x 212 is input into the DNN classifier 224 which outputs the classification of the input x 212 as result y=f(x) 226, where again y has confidence score values associated with vector slots representing the various classifications, e.g., A, B, C, D in FIG. 2.

The difference between the input data x and its corresponding decoy x', i.e. (x'−x), is calculated and represents the target deceptive perturbation Δx. It should be appreciated that x and x', and x" in the alternative embodiments in which a watermarked image is utilized as a decoy, are matrices of pixel values. Thus, the difference between the input data x and the decoy x' is the difference between corresponding pixel values at each entry in the matrices.

Instead of returning the real y output 226 to the user, a false or fake classification y' 232 is calculated to equate the gradient of the DNN classifier's loss function L to (x'−x), or Δx representing the target deceptive perturbation 230, ensuring that the largest class label of y' 232 remains equal to y (argmax(y)=argmax(y')). The output y' 232 is the false or fake classification result and is returned to the user. The output y' 232 may be generated by an additional output layer of the DNN classifier that modifies y to be y', a separate logic unit outside of the DNN classifier that receives y and generates y', or any other logic implementation that may replace the real y output 226 with the false or fake classification y'.

If a benign user receives y' 232, the user still gets a correct classification result since argmax(y)=argmax(y'). For example, as shown in the example of FIG. 2, even though the confidence score values are different between y 226 and y' 232, the correct classification of class "A" is still achieved. However, if an attacker 242 uses y' to calculate the gradient for the input data x, the attacker 242 will get λ(x'−x)+x=x', where λ is the attacker's learning rate or step. In this way, the attacker will recover the predefined decoy data x' 214, which can be further used by the machine learning or cognitive system to flag adversarial behavior and/or take appropriate action. That is, if the attacker 242 submits a query to the DNN classifier 224 that includes decoy data x' 214, in an attempt to perform a model inversion attack, the decoy data x' 214 may be detected in the query and corresponding flagging, logging, and responsive action may be taken to address such a model inversion attack.

Figure 3A:
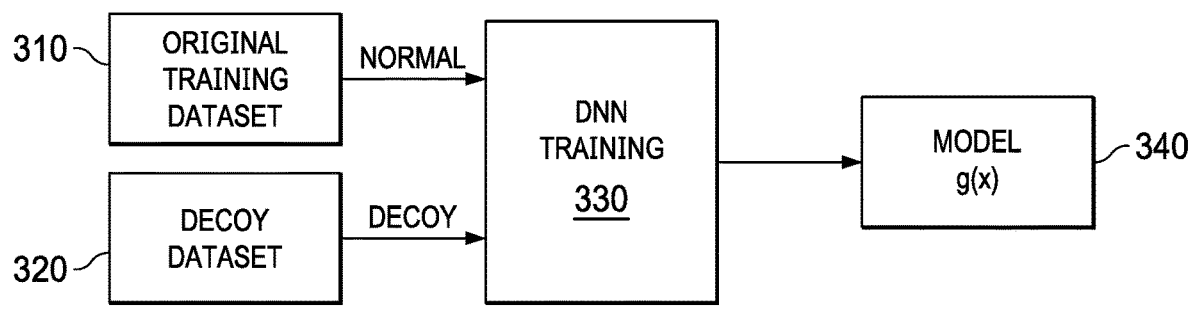
FIGS. 3A and 3B show an outline of the training and use of a separate DNN classifier model for use in detecting a model inversion attack based on a decoy dataset input from an attacker in accordance with one illustrative embodiment.
Figure 3B:
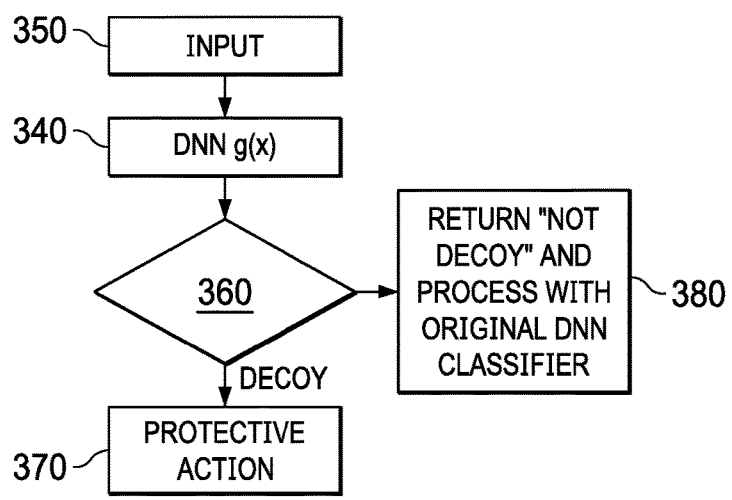

For example, FIGS. 3A and 3B show an outline of the training and use of a separate DNN classifier model for use in detecting a model inversion attack based on a decoy dataset input from an attacker in accordance with one illustrative embodiment. As shown in FIG. 3A, in order to detect a model inversion attack, a separate DNN classifier model g(x) 340 is trained 330 with the original training dataset 310 and the decoy dataset 320. The training 330 of the model g(x) 340 involves training the DNN classifier model g(x) 340 to classify the input data into either a genuine training data or a decoy data class. Such classification may be a separate classification from a classification of the input data into other classes as well, but the main purpose of the separate DNN classifier model g(x) 340 is to detect decoy input data and thus, this separate DNN classifier model g(x) 340 is referred to as the decoy detection model g(x) 340. The training itself may follow a supervised or unsupervised training operation as previously discussed above, similar to the manner in which the original DNN classifier model f(x) is trained.

Having trained the decoy detection model g(x) 340 to properly classify input data as either genuine input data or decoy input data, during runtime operation, as shown in FIG. 3B, when the machine learning or cognitive system frontend application programming interface (API) receives a query or request from a user, e.g. an input image is received for classification, the request or query is further relayed to the decoy detection model g(x) 340. The decoy detection model g(x) 340 is invoked on the input 350 to determine whether the input 350 is a reconstructed, i.e. model inverted, decoy or is a genuine input. The determination 360 results in a classification by the decoy detection model g(x) 340 of either the input 350 representing or including genuine input in which case the processing of the input data 350 via the original DNN classifier model f(x) is performed 380, or a classification of the input 350 as representing or including a decoy input obtained by the attacker through a model inversion attack. In the latter case, the protective actions 370 may then be performed. These protective actions may comprise various types of actions depending on the desired implementation including, but not limited to, logging the suspicious attempt to access the DNN classifier, sending a notification to a computing device associated with an authorized person, preventing further access to resources by the source of the input 350, redirecting the input 350 processing to a secured set of resources, a false or honeypot dataset, or the like, etc.

Thus, the illustrative embodiments provide mechanisms for providing pre-determined decoy datasets to which gradient based model inversion attacks are directed to thereby prevent attackers from being able to recreate or approximate an original training dataset from the implicit storage of such in the DNN classifier itself. The fact that the decoy datasets are predetermined and mechanisms are provided to point attackers to specific decoys in the decoy datasets, allows for detection of the attacker's use of such decoys when attempting to perform a model inversion attack. This detection may then be used to perform protective actions to prevent further model inversion attacks from the attacker and notify authorized personnel that may take further action to identify the attacker, invoke protections against the attacker, and involve appropriate law enforcement if necessary.

Figure 4:
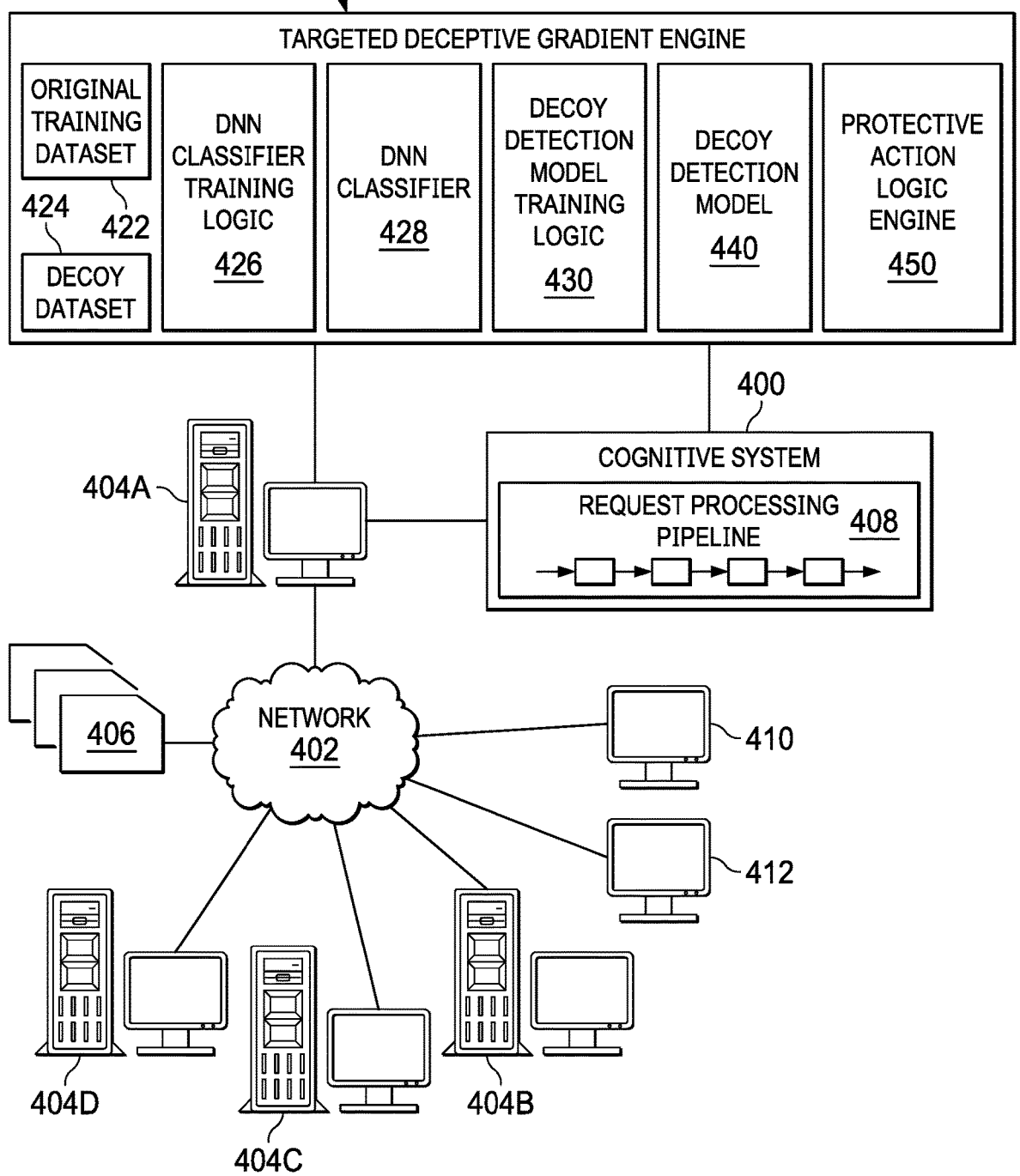
FIG. 4 is an example diagram of a distributed data processing system environment in which a cognitive system employing a neural network classifier and with which aspects of the present invention may be implemented.
Figure 5:
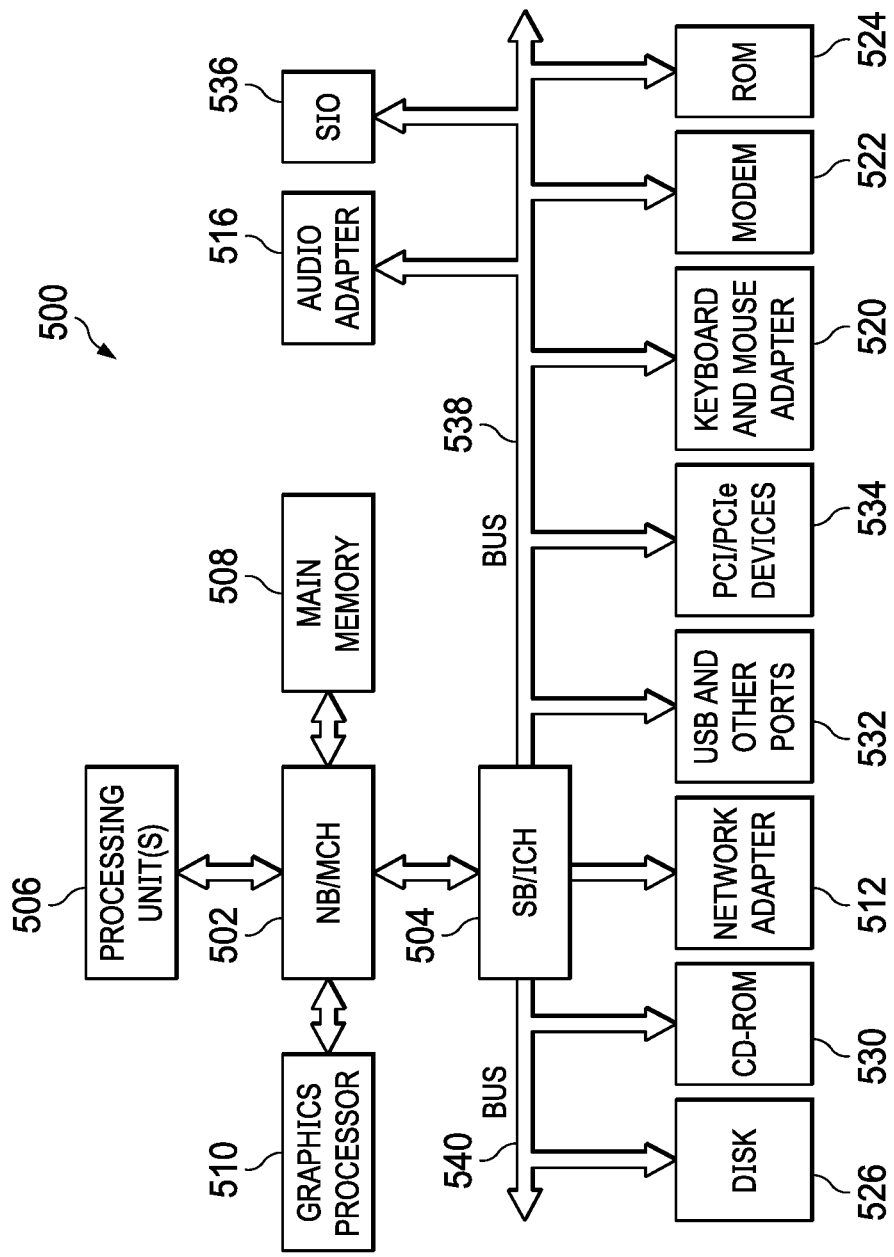
FIG. 5 is an example block diagram of a data processing system in which aspects of the illustrative embodiment may be implemented.

As is clear from the above, the illustrative embodiments provide mechanisms directed to protecting neural network models, machine learning systems implementing such neural networks, cognitive systems implementing such neural networks, and the like, implemented in specialized logic of specially configured computing devices, data processing systems, or the like, of a technological environment. As such, the illustrative embodiments may be utilized in many different types of data processing environments. FIGS. 4 and 5 are provided hereafter as example environments in which aspects of the illustrative embodiments may be implemented. It should be appreciated that FIGS. 4-5 are only examples and are not intended to assert or imply any limitation with regard to the environments in which aspects or embodiments of the present invention may be implemented. Many modifications to the depicted environments may be made without departing from the spirit and scope of the present invention.

FIGS. 4-5 are directed to describing an example cognitive system which implements a request processing pipeline, request processing methodology, and request processing computer program product with which the mechanisms of the illustrative embodiments are implemented. These requests may be provided as structured or unstructured request messages, natural language questions, or any other suitable format for requesting an operation to be performed by the cognitive system. In some illustrative embodiments, the requests may be in the form of input data sets that are to be classified in accordance with a cognitive classification operation performed by a machine learning, neural network, deep learning, or other artificial intelligence based model that is implemented by the cognitive system. The input data sets may represent various types of input data depending upon the particular implementation, such as audio input data, image input data, textual input data, or the like. For example, in one possible implementation, the input data set may represent a facial input image for facial recognition operations, fingerprint, retinal scan, or other biometric input image, or the like, that is to have portions of the image, or the image as a whole, classified into one or more predefined classifications.

It should be appreciated that classification of input data may result in a labeled set of data that has labels or annotations representing the corresponding classes into which the non-labeled input data set is classified. This may be an intermediate step in performing other cognitive operations by the cognitive system that support decision making by human users, e.g., the cognitive system may be a decision support system. For example, in a security domain, the cognitive system may operate to perform analysis on images captured by video camera surveillance to identify individuals of particular interest for further investigation, identify individuals that are authorized/not authorized to access protected physical and/or logical resources, or the like.

It should be appreciated that the cognitive system, while shown as having a single request processing pipeline, may in fact have multiple request processing pipelines. Each request processing pipeline may be separately trained and/or configured to process requests associated with different domains or be configured to perform the same or different analysis on input requests, depending on the desired implementation. For example, in some cases, a first request processing pipeline may be trained to operate on input requests directed to a facial image analysis, while a second request processing pipeline may be configured and trained to operate on input requests concerning patient electronic medical record (EMR) analysis involving natural language processing. In other cases, for example, the request processing pipelines may be configured to provide different types of cognitive functions or support different types of applications, such as one request processing pipeline being used for security purposes, and another pipeline being trained for patient treatment recommendation generation, etc.

Moreover, each request processing pipeline may have their own associated corpus or corpora that they ingest and operate on, e.g., one corpus for medical treatment documents and another corpus for financial industry domain related documents in the above examples. In some cases, the request processing pipelines may each operate on the same domain of input requests but may have different configurations, e.g., different annotators or differently trained annotators, such that different analysis and potential answers are generated. The cognitive system may provide additional logic for routing input requests to the appropriate request processing pipeline, such as based on a determined domain of the input request, combining and evaluating final results generated by the processing performed by multiple request processing pipelines, and other control and interaction logic that facilitates the utilization of multiple request processing pipelines.

As discussed above, the illustrative embodiments may be integrated in, augment, and extend the functionality of the request processing pipeline to include mechanisms to protect the DNN classifier models implemented in these pipelines, or by the machine learning or cognitive system as a whole, from model inversion attacks. In particular, in portions of the machine learning or cognitive system in which the trained deep learning neural network (DNN) classifier models are employed to generate labeled data set outputs, the mechanisms of the illustrative embodiments may be implemented to protect the DNN classifier from potential attackers learning the training dataset used to train the DNN classifier from the gradients generated based on the output of the DNN classifier. That is, the mechanisms of the illustrative embodiments provide deceptive gradients that point the attacker to a predefined decoy dataset rather than the original training dataset. Thereafter, if the attacker attempts to perform a model inversion attack by presenting a recreated decoy data input to the DNN classifier, the use of the recreated decoy data input may be detected and protective action implemented.

As an overview, the cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, image analysis logic, or the like, for example, and machine learning logic, which may be provided as specialized hardware, software executed on hardware, or any combination of specialized hardware and software executed on hardware. This logic may implement one or more models, such as a neural network model, a machine learning model, a deep learning model, that may be trained for particular purposes for supporting the particular cognitive operations performed by the cognitive system. In accordance with the mechanisms of the illustrative embodiments, the logic further implements the targeted deceptive gradient engine mechanisms described above, and hereafter, for directing attackers to predefined decoy datasets and thereby protect the training of the DNN classifier models from those who would attempt to perform model inversion attacks.

The logic of the cognitive system implements the cognitive computing operation(s), examples of which include, but are not limited to, question answering, identification of related concepts within different portions of content in a corpus, intelligent search algorithms, such as Internet web page searches, for example, medical diagnostic and treatment recommendations, other types of recommendation generation, e.g., items of interest to a particular user, potential new contact recommendations, etc., image analysis and classification, audio analysis and classification, and the like. The types and number of cognitive operations that may be implemented using the cognitive system of the illustrative embodiments are vast and cannot all be documented herein.

Any cognitive computing operation emulating decision making and analysis performed by human beings, but in an artificial intelligence or cognitive computing manner, is intended to be within the spirit and scope of the present invention.

IBM Watson™ is an example of one such cognitive computing system which can process human readable language and identify inferences between text passages with human-like high accuracy at speeds far faster than human beings and on a larger scale. In general, such cognitive systems are able to perform various ones and/or combinations of the following functions: (1) navigate the complexities of human language and understanding; (2) ingest and process vast amounts of structured and unstructured data; (3) generate and evaluate hypothesis; (4) weigh and evaluate responses that are based only on relevant evidence; (5) provide situation-specific advice, insights, and guidance; (6) improve knowledge and learn with each iteration and interaction through machine learning processes; (7) enable decision making at the point of impact (contextual guidance); (8) scale in proportion to the task; (9) extend and magnify human expertise and cognition; (10) identify resonating, human-like attributes and traits from natural language; (11) deduce various language specific or agnostic attributes from natural language; (12) high degree of relevant recollection from data points (images, text, voice) (memorization and recall); (13) predict and sense with situational awareness that mimic human cognition based on experiences; and (14) answer questions based on natural language and specific evidence.

FIG. 4 depicts a schematic diagram of one illustrative embodiment of a cognitive system 400 implementing a request processing pipeline 408, which in some embodiments may be a question answering (QA) pipeline, in a computer network 402. For purposes of the present description, it will be assumed that the request processing pipeline 408 operates on structured and/or unstructured requests in the form of input requests that may comprise input data for classification by a neural network based classifier as part of the operation of the cognitive system, e.g., a DNN classifier used to classify input data into one of a plurality of predefined classifications. In one illustrative embodiment, the request processing pipeline 408 invokes the DNN classifier to perform classification on an input image provided in the received request, although as discussed above, the illustrative embodiments are not limited to image data but may in fact operate on any data that may be classified using a neural network or machine learning based classifier, e.g., text input data, image input data, audio input data, or the like.

The cognitive system 400 is implemented on one or more computing devices 404A-D (comprising one or more processors and one or more memories, and potentially any other computing device elements generally known in the art including buses, storage devices, communication interfaces, and the like) connected to the computer network 402. For purposes of illustration only, FIG. 4 depicts the cognitive system 400 being implemented on computing device 404A only, but as noted above the cognitive system 400 may be distributed across multiple computing devices, such as a plurality of computing devices 404A-D. It should be appreciated that the computing devices 404A-D which are used to implement the cognitive system 400 are specifically configured to be special purpose computing systems for specifically providing the cognitive system 400 and thus, are not generic computing systems once configured to implement the cognitive system 400.

The network 402 includes multiple computing devices 404A-D, which may operate as server computing devices, and 410-412 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 400 and network 402 enables question and answer (QA) processing functionality for one or more cognitive system users via their respective computing devices 410-412. In other embodiments, the cognitive system 400 and network 402 may provide other types of cognitive operations including, but not limited to, request processing and cognitive response generation which may take many different forms depending upon the desired implementation, e.g., cognitive information retrieval, training/instruction of users, cognitive evaluation of data, or the like. In some illustrative embodiments, the cognitive system 400 and network 402 may provide mechanisms for enabling security to protect physical and/or logic resources, such as computing systems, databases, particular files or data maintained by computing systems, physical premises, etc. based on the cognitive evaluation of a user's request to access such secured resources, which in some embodiments may involve some aspect of image analysis, e.g., facial recognition, retinal scan authorization, fingerprint authorization, or other biometric based security operations. Other embodiments of the cognitive system 300 may be used with components, systems, sub-systems, and/or devices other than those that are depicted herein.

The cognitive system 400 is configured to implement a request processing pipeline 408 that receive inputs from various sources. The requests may be posed in the form of a natural language question, natural language request for information, natural language request for the performance of a cognitive operation, or the like. For example, the cognitive system 400 receives input from the network 402, a corpus or corpora of electronic documents 406, cognitive system users, and/or other data and other possible sources of input. In one embodiment, some or all of the inputs to the cognitive system 400 are routed through the network 402. The various computing devices 404A-D on the network 402 include access points for content creators and cognitive system users. Some of the computing devices 404A-D include devices for a database storing the corpus or corpora of data 406 (which is shown as a separate entity in FIG. 4 for illustrative purposes only). Portions of the corpus or corpora of data 406 may also be provided on one or more other network attached storage devices, in one or more databases, or other computing devices not explicitly shown in FIG. 4. The network 402 includes local network connections and remote connections in various embodiments, such that the cognitive system 400 may operate in environments of any size, including local and global, e.g., the Internet.

In one embodiment, the content creator creates content in a document of the corpus or corpora of data 406 for use as part of a corpus of data with the cognitive system 400. The document includes any file, text, article, or source of data for use in the cognitive system 400. Cognitive system users access the cognitive system 400 via a network connection or an Internet connection to the network 402, and input questions/requests to the cognitive system 400 that are answered/processed based on the content in the corpus or corpora of data 406. In one embodiment, the questions/requests are formed using natural language. The cognitive system 400 parses and interprets the question/request via a pipeline 408, and provides a response to the cognitive system user, e.g., cognitive system user 410, containing one or more answers to the question posed, response to the request, results of processing the request, or the like. In some embodiments, the cognitive system 400 provides a response to users in a ranked list of candidate answers/responses while in other illustrative embodiments, the cognitive system 400 provides a single final answer/response or a combination of a final answer/response and ranked listing of other candidate answers/responses.

The cognitive system 400 implements the pipeline 408 which comprises a plurality of stages for processing an input question/request based on information obtained from the corpus or corpora of data 406. At one or more of these stages of the pipeline 408, a neural network classifier, such as a DNN classifier, may be invoked to perform classification on at least a portion of the input provided in or with the input question/request. For example, the input question/request may comprise input image data that is to be classified by the DNN classifier as part of the processing of the input question/request by the pipeline 408. Thus, at one or more stages of the pipeline 408, the DNN classifier may be invoked to perform such classification. Ultimately, the pipeline 408 generates answers/responses for the input question or request based on the processing of the input question/request, the input data associated with the input question/request, and the corpus or corpora of data 406.

In some illustrative embodiments, the cognitive system 400 may be the IBM Watson™ cognitive system available from International Business Machines Corporation of Armonk, N.Y., which is augmented with the mechanisms of the illustrative embodiments described herein. With the IBM Watson™ cognitive system implementation, the pipeline 408 receives an input question or request which it then parses to extract the major features of the question/request, which in turn are then used to formulate queries that are applied to the corpus or corpora of data 406. Based on the application of the queries to the corpus or corpora of data 406, a set of hypotheses, or candidate answers/responses to the input question/request, are generated by looking across the corpus or corpora of data 406 for portions of the corpus or corpora of data 406 (hereafter referred to simply as the corpus 406) that have some potential for containing a valuable response to the input question/response (hereafter assumed to be an input question). The pipeline 408 of the IBM Watson™ cognitive system then performs deep analysis on the language of the input question and the language used in each of the portions of the corpus 406 found during the application of the queries using a variety of reasoning algorithms.

The scores obtained from the various reasoning algorithms are then weighted against a statistical model that summarizes a level of confidence that the pipeline 308 of the IBM Watson™ cognitive system 400, in this example, has regarding the evidence that the potential candidate answer is inferred by the question. This process may be repeated for each of the candidate answers to generate ranked listing of candidate answers which may then be presented to the user that submitted the input question, e.g., a user of client computing device 410, or from which a final answer is selected and presented to the user. More information about the pipeline 408 of the IBM Watson™ cognitive system 400 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

While the input to the cognitive system 400 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis.

Regardless of the manner by which the question or request is input to the cognitive system 400, the processing of the request or question involves the application of a trained model, e.g., neural network model, machine learning model, deep learning model, etc., to an input data set as described previously above. This input data set may represent features of the actual request or question itself, data submitted along with the request or question upon which processing is to be performed, or the like. The application of the trained model to an input data set may occur at various points during the performance of the cognitive computing operations by the cognitive system. For example, the trained model may be utilized during feature extraction and classification by a feature extraction stage of processing of the request or input question, e.g., taking a natural language term in the request or question and classifying it as one of a plurality of possible concepts that the term corresponds to, e.g., classifying the term "truck" in an input question or request into a plurality of possible classes, one of which may be "vehicle". As another example, a portion of an image comprising a plurality of pixel data may have the trained model applied to it to determine what the object is that is in the portion of the image. The mechanisms of the illustrative embodiments operate on the output of the trained model as discussed previously above, which may be an intermediate operation within the overall cognitive system's cognitive computing operations, e.g., classification of a portion of a medical image into one of a plurality of different anatomical structures may be an intermediate operation to performing an anomaly identification and treatment recommendation cognitive computing operation.

As shown in FIG. 4, the cognitive system 400 is further augmented, in accordance with the mechanisms of the illustrative embodiments, to include logic implemented in specialized hardware, software executed on hardware, or any combination of specialized hardware and software executed on hardware, for implementing a targeted deceptive gradient engine 420. The targeted deceptive gradient engine 320 may be provided as an external engine to the logic implementing the trained model 360 of the cognitive system 400 or may be integrated into the trained model logic 460, such as in a layer of the model prior to the output of a vector output of probability values representing the classification of the input data and its corresponding labels. The targeted deceptive gradient engine 420 operates to insert perturbations into the output probabilities generated by the trained model logic 460 such that gradients calculated for points along a curve represented by the output probabilities deviate from a correct direction and amount and also minimize accuracy loss in the modified output classifications and corresponding labels. Importantly, the deviation is directed to a predetermined decoy dataset such that the predetermined decoy dataset may be used as a "fingerprint" or mechanism for identify model inversion attacks and invoking protective measures.

In one illustrative embodiment, the targeted deceptive gradient engine 420 comprises original training dataset 422, decoy dataset 424, DNN classifier training logic 426, DNN classifier 428, decoy detection model training logic 430, decoy detection model 440, and protective action logic engine 450. The original training dataset 422 comprises data used for training the DNN classifier 428 through a supervised or unsupervised machine learning process. In some illustrative embodiments, the original training dataset 422 may comprise, for example, image data representing images for which known classifications are provided. The training of the DNN classifier 428 performed by the DNN classifier training logic 426 trains the DNN classifier 428 to properly classify an input image to the known correct classification. Such training may comprise, for example, modifying internal operating parameters of the DNN classifier 428, e.g., weights associated with nodes in the DNN classifier 422, through an iterative process to minimize a loss function associated with the DNN classifier 428.

In addition, the DNN classifier training logic 426 configures the DNN classifier 428 to output a false or rake classification result based on the decoy dataset 424, as discussed previously above. For example, the DNN classifier 428 may have an additional set of outputs nodes or the like which calculate a false of fake output y', as opposed to the correct output y, in the manner previously described above so that the output, while providing the correct classification, provides perturbed confidence scores or probabilities that point any gradient determinations towards the decoy dataset 424 rather than the original training dataset 422. As noted above, this may be achieved by determining the differences between the input data and its corresponding decoy (x–x') and then, instead of returning the real y output to a user, a false or fake classification result y' is calculated to equate the gradient of the DNN classifier 428 loss function to (x'–x), ensuring that the largest class label of y' remains equal to y (argmax(y)=argmax(y')).

Thus, the resulting modified output vector y' provides modified probability values while maintaining the correctness of the classification and associated labels that are associated with the input data in a labeled data set. Thus, correct classification and labeling of the input data set is still performed while redirecting any attempts to recreate the training dataset used to train the DNN classifier 428 to the decoy dataset 424 as opposed to the original training dataset 422. During runtime, when input data is received by the request processing pipeline 408 and classified by the DNN classifier 428 during one of the stages of processing, the DNN classifier 428 will return the correct classification despite the modified output vector y' and the resulting classified or labeled data set may be provided to further stages of processing downstream in the pipeline 408 for further processing and performance of the overall cognitive operation for which the cognitive system 400 is employed.

Thus, an attacker, such as a user of client computing device 410 or the like, is not able to submit a plurality of input data sets, obtain corresponding labeled output data sets and corresponding probability values of output vectors, and thereby generate their own version of the original training dataset 422 and train their own trained models to accurately replicate the training of the trained DNN classifier 428. To the contrary, should the attacker attempt to recreate the original training dataset 422, such as via a model inversion attack, the attacker would be training the DNN classifier based on the decoy dataset 424 resulting in a model that provides significantly lower performance than that of the trained DNN classifier 428, which in turn results in a need to continue to utilize the trained DNN classifier 428. In the case where a service provider charges a fee for utilization of the cognitive system 400 and/or trained DNN classifier 428, this will result in a continued revenue stream for the service provider.

In addition to these mechanisms to prevent attackers from recreating the original training dataset 422 and instead redirecting model inversion attacks towards the predetermine decoy dataset 424, the targeted deceptive gradient engine 420 further provides a separately trained DNN classifier, referred to as the decoy detection model 440, that is trained by the decoy detection model training logic 430 based on the original training dataset 422 and decoy dataset 424. The separately trained decoy detection model 440 is trained to differentiate between inputs that are genuine inputs and those that are a recreation of decoy data from the decoy dataset 424. That is, when a request is received by the cognitive system 400 comprising input data, the input data is sent to the decoy detection model 440 that is trained on both the original training dataset 422 and the decoy dataset 424. The training of the decoy detection model 440 by the training logic 430 causes the decoy detection model 440 to properly classify input data into a class of either a genuine input or a decoy input.

This classification is performed on the input received by the cognitive system 400. If it is determined that the input is genuine, then the DNN classifier 428 may be invoked to perform classification on the input and return the proper classification for the input to the cognitive system 400 and/or pipeline 408 for further processing. If the classification by the decoy detection model 440 results in a determination that the input is a recreation of decoy data, i.e. the input is part of an attacker's model inversion attack, then protective action logic engine 450 may be invoked by the decoy detection model 440 to perform protective actions against the model inversion attack. As noted above, these protective actions may take many forms depending on the implementation including logging such model inversion attack attempts, blocking access, notifying authorized personnel, and the like.

It should be appreciated that while FIG. 4 illustrates the implementation of the trained DNN classifier 428 as part of the targeted deceptive gradient engine 420 and the cognitive system 400, the illustrative embodiments are not limited to such. Rather, in some illustrative embodiments, the trained DNN classifier 428 itself may be provided as a service from which a user of a client computing device 410, may request processing of an input data set. Moreover, other providers of services, which may include other cognitive systems, may utilize such a trained DNN classifier 428 to augment the operation of their own cognitive systems. Thus, in some illustrative embodiments the trained DNN classifier 428 may be implemented in one or more server computing devices, accessed via one or more APIs via other computing devices through which input data sets are submitted to the trained DNN classifier 428, and corresponding labeled data sets are returned. Thus, the integration of the mechanisms of the illustrative embodiments into a targeted deceptive gradient engine 420 and/or cognitive system 400 is not required, but may be performed depending on the desired implementation.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 5 is provided as an example of one type of data processing system in which aspects of the present invention may be implemented. Many other types of data processing systems may be likewise configured to specifically implement the mechanisms of the illustrative embodiments.

FIG. 5 is a block diagram of an example data processing system in which aspects of the illustrative embodiments are implemented. Data processing system 500 is an example of a computer, such as server computing device 404A or client computing device 410 in FIG. 4, in which computer usable code or instructions implementing the processes for illustrative embodiments of the present invention are located. In one illustrative embodiment, FIG. 5 represents a server computing device, such as a server 404A, which implements a cognitive system 400 and request pipeline 408 augmented to include the additional mechanisms of the illustrative embodiments described herein with regard to a targeted deceptive gradient engine 420 for protecting the trained DNN classifier 428 from model inversion attacks.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 is connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 is connected to SB/ICH 504.

An operating system runs on processing unit 506. The operating system coordinates and provides control of various components within the data processing system 500 in FIG. 5. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM® eServer™ System p® computer system, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and are loaded into main memory 508 for execution by processing unit 506. The processes for illustrative embodiments of the present invention are performed by processing unit 506 using computer usable program code, which is located in a memory such as, for example, main memory 508, ROM 524, or in one or more peripheral devices 526 and 530, for example.

A bus system, such as bus 538 or bus 540 as shown in FIG. 5, is comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, includes one or more devices used to transmit and receive data. A memory may be, for example, main memory 508, ROM 524, or a cache such as found in NB/MCH 502 in FIG. 5.

Those of ordinary skill in the art will appreciate that the hardware depicted in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

Figure 6:
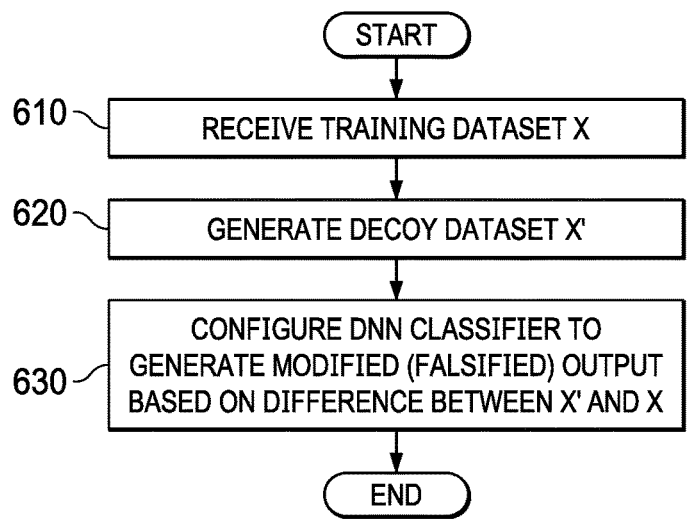
FIG. 6 is a flowchart outlining an example operation for protecting a neural network model against model inversion attacks in accordance with one illustrative embodiment.

FIG. 6 is a flowchart outlining an example operation for protecting a DNN classifier from model inversion attacks in accordance with one illustrative embodiment. As shown in FIG. 6, the operation starts by receiving a training dataset x (step 610). A decoy dataset x' is generated by generating decoy data for each class recognized by the DNN classifier (step 620). The DNN classifier is configured to include a false or fake classification result generation logic layer, e.g., a false classification result node layer, that generates a false or fake classification result y' to equate the gradient of the DNN classifier's loss function to the difference between the original input training data and the generated decoy data for each class, ensuring that the largest class label of the false or fake classification result y' remains equal toy (the actual classification result) (step 630). In this way, if a benign user receives y' when they provide an input to be processed by the DNN classifier, the user still gets a correct classification. However, an attacker, attempting to use y' to calculate the gradient for the input data x, will get x' instead, i.e. the decoy data. The operation then terminates.

Figure 7:
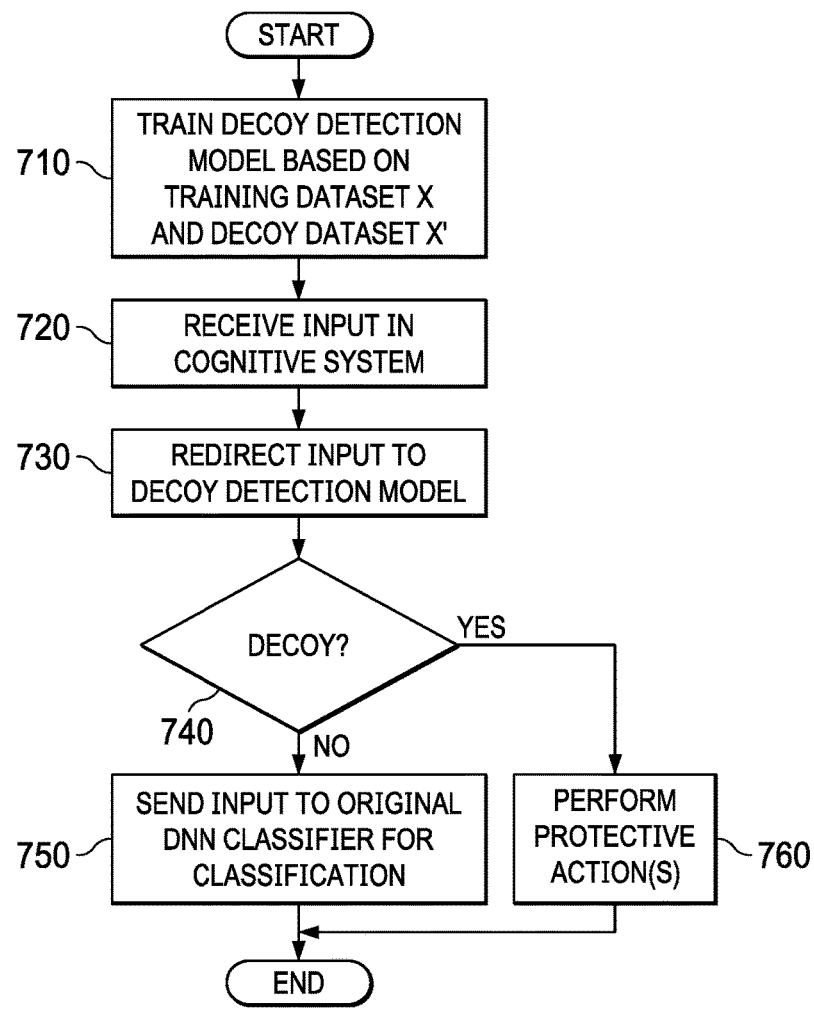
FIG. 7 is a flowchart outlining an example operation for training and using a decoy detection model to detect model inversion attacks in accordance with one illustrative embodiment.

FIG. 7 is a flowchart outlining an example operation for training and using a decoy detection model in accordance with one illustrative embodiment. As shown in FIG. 7, the operation starts by training a separate DNN classifier based on an original training dataset and a decoy dataset, to differentiate between genuine data (e.g., data from the original training dataset during training) and decoy data (e.g., data from the decoy dataset) (step 710). This separate DNN classifier is referred to as the decoy detection model and outputs classifications of whether an input to the decoy detection model is a genuine input or is a recreation of data from the decoy dataset.

After training the decoy detection model, when an input is received (step 720), the input is redirected to the decoy detection model for classification (step 730). The decoy detection model determines whether the input data is a genuine input or a recreation of decoy data from the decoy dataset (step 740). If the decoy detection model determines that the input data is genuine, then the input data is forwarded to the original DNN classifier for classification (step 750). If the decoy detection model determines that the input data is decoy data, then protective action logic is initiated to perform a protective action according to the particular implementation (step 760). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for protecting a neural network model against model inversion attacks, the method being performed in a data processing system comprising at least one processor and at least one memory, the at least one memory comprising instructions executed by the at least one processor to specifically configure the at least one processor to implement the neural network model and a targeted deceptive gradient engine, the method comprising:
    generating, by the targeted deceptive gradient engine, a decoy dataset comprising decoy data for each class recognized by the neural network model;
    configuring, by the targeted deceptive gradient engine, a first neural network model to generate a modified output based on the decoy dataset that directs a gradient of the modified output to the decoy dataset;
    receiving, by the first neural network model, from a source computing device, input data to be processed by the first neural network model;
    processing, by the first neural network model, the input data to generate an actual output;
    modifying, by the first neural network model, one or more actual elements of the actual output to be one or more corresponding modified elements of the modified output; and
    returning, by the first neural network model, the one or more corresponding modified elements instead of the one or more actual elements, to the source computing device.

2. The method of claim 1, wherein the modified output obscures a gradient of a loss function of the first neural network model.

3. The method of claim 1, wherein the one or more modified elements of the modified output provide a correct classification of the input data, but modified confidence scores associated with the classifications that direct a gradient of a loss function of the first neural network model towards the decoy dataset.

4. The method of claim 1, wherein the modified output equates a gradient of a loss function of the first neural network model to a difference between the decoy data and training data used to train the first neural network model for each class recognized by the first neural network model.

5. The method of claim 1, wherein the modified output maintains a largest class label between the modified output and actual output of the first neural network model to be the same largest class label.

6. The method of claim 1, further comprising:
    training a second neural network model with an original training dataset and the decoy dataset to identify input data as being either actual input data corresponding to the original training dataset or decoy data corresponding to the decoy dataset; and determining, by the second neural network model, whether the received input data, for processing by the first neural network model, approximates decoy data in the decoy dataset.

7. The method of claim 6, wherein the first neural network model processes the input data in response to the second neural network model determining that the received input data does not approximate decoy data in the decoy dataset.

8. The method of claim 6, further comprising:
performing, by a protective action logic engine executing in the data processing system, a protective action in response to a determination by the second neural network model that the received input data approximates decoy data in the decoy dataset.

9. The method of claim 8, wherein the protective action comprises at least one of logging a request associated with the received input data, sending a notification message to a system administrator, or preventing access to a protected resource.

10. The method of claim 1, wherein the data processing system is a cloud computing system comprising a plurality of server computing devices, and wherein the at least one processor and at least one memory comprise at least one processor and at least one memory in each server computing device in the plurality of server computing devices.

11. A computer program product comprising a computer readable storage medium having a computer readable program stored therein, wherein the computer readable program, when executed on a data processing system, causes the data processing system to specifically configure the data processing system to implement a first neural network model and a targeted deceptive gradient engine, the data processing system being further configured by the computer readable program to:
generate, by the targeted deceptive gradient engine, a decoy dataset comprising decoy data for each class recognized by the neural network model;
configure, by the targeted deceptive gradient engine, a first neural network model to generate a modified output based on the decoy dataset that directs a gradient of the modified output to the decoy dataset;
receive, by the first neural network model, from a source computing device, input data to be processed by the first neural network model;
process, by the first neural network model, the input data to generate an actual output;
modify, by the first neural network model, one or more actual elements of the actual output to be one or more corresponding modified elements of the modified output; and
return, by the first neural network model, the one or more corresponding modified elements instead of the one or more actual elements, to the source computing device.

12. The computer program product of claim 11, wherein the modified output obscures a gradient of a loss function of the first neural network model.

13. The computer program product of claim 11, wherein the one or more modified elements of the modified output provide a correct classification of the input data, but modified confidence scores associated with the classifications that direct a gradient of a loss function of the first neural network model towards the decoy dataset.

14. The computer program product of claim 11, wherein the modified output equates a gradient of a loss function of the first neural network model to a difference between the decoy data and training data used to train the first neural network model for each class recognized by the first neural network model.

15. The computer program product of claim 11, wherein the modified output maintains a largest class label between the modified output and actual output of the first neural network model to be the same largest class label.

16. The computer program product of claim 11, wherein the data processing system is further configured by the computer readable program to:
train a second neural network model with an original training dataset and the decoy dataset to identify input data as being either actual input data corresponding to the original training dataset or decoy data corresponding to the decoy dataset; and
determine, by the second neural network model, whether the received input data, for processing by the first neural network model, approximates decoy data in the decoy dataset.

17. The computer program product of claim 16, wherein the first neural network model processes the input data in response to the second neural network model determining that the received input data does not approximate decoy data in the decoy dataset.

18. The computer program product of claim 16, wherein the data processing system is further configured by the computer readable program to:
perform, by a protective action logic engine executing in the data processing system, a protective action in response to a determination by the second neural network model that the received input data approximates decoy data in the decoy dataset.

19. The computer program product of claim 18, wherein the protective action comprises at least one of logging a request associated with the received input data, sending a notification message to a system administrator, or preventing access to a protected resource.

20. A data processing system comprising:
at least one processor; and
at least one memory coupled to the at least one processor, wherein the at least one memory comprises instructions which, when executed by the at least one processor, cause the at least one processor to specifically configure the at least one processor to implement a first neural network model and a targeted deceptive gradient engine, the at least one processor being further configured by the instructions to:
generate, by the targeted deceptive gradient engine, a decoy dataset comprising decoy data for each class recognized by the neural network model;
configure, by the targeted deceptive gradient engine, a first neural network model to generate a modified output based on the decoy dataset that directs a gradient of the modified output to the decoy dataset;
receive, by the first neural network model, from a source computing device, input data to be processed by the first neural network model;
process, by the first neural network model, the input data to generate an actual output;
modify, by the first neural network model, one or more actual elements of the actual output to be one or more corresponding modified elements of the modified output; and
return, by the first neural network model, the one or more corresponding modified elements instead of the one or more actual elements, to the source computing device.

* * * * *